United States Patent
Avery, Jr.

(10) Patent No.: US 6,404,299 B1
(45) Date of Patent: Jun. 11, 2002

(54) DEVICES, METHODS, AND SYSTEMS FOR NETWORK HUB PARTIAL TERMINATION

(75) Inventor: William H. Avery, Jr., Sparks, NV (US)

(73) Assignee: Russound/FMP, Inc., Newmarket, NH (US)

(*) Notice: Subject to any disclaimer, the term of this patent is extended or adjusted under 35 U.S.C. 154(b) by 0 days.

(21) Appl. No.: 09/126,723

(22) Filed: Jul. 31, 1998

(51) Int. Cl.[7] .............................. H01P 1/26; G01R 27/04

(52) U.S. Cl. ..................... 333/124; 333/22 R; 324/646

(58) Field of Search .................................. 324/646, 650, 324/637; 333/17.3, 124, 22 R, 32; 361/749

(56) References Cited

U.S. PATENT DOCUMENTS

| | | | | |
|---|---|---|---|---|
| 3,091,743 A | | 5/1963 | Wilkinson | 333/9 |
| 4,725,794 A | | 2/1988 | Barczys | 333/100 |
| 5,210,682 A | | 5/1993 | Takashima | 361/396 |
| 5,341,509 A | * | 8/1994 | Takashima | 361/749 |
| 5,559,441 A | * | 9/1996 | Desroches | 324/647 |
| 5,734,658 A | | 3/1998 | Rall et al. | 370/438 |

OTHER PUBLICATIONS

International Preliminary Examination Report on International Application No. PCT/US98/15321, dated Jul. 31, 1998, submitted by the International Preliminary Examining Authority on Oct. 18, 2000.
http://www.its.bldrdoc.gov/fs-1037/dir-009/_1337.htm (website).
http://csep1.phy.ornl.gov/gif_figures/caf14.gif (website).

* cited by examiner

*Primary Examiner*—Safet Metjahic
*Assistant Examiner*—J Kerveros
(74) *Attorney, Agent, or Firm*—Weingarten, Schurgin, Gagnebin & Lebovici LLP

(57) ABSTRACT

The present invention provides a system and device for a network hub that includes a single valued resistor placed in series with each transmission line such that reflected and other unwanted waves in the transmission line are rapidly dampened to prevent interference and errors in transmission. The present invention also provides a method and system for determining an appropriate single valued resistor serially placeable within a transmission line in a network such that reflected and other unwanted waves in the transmission line are rapidly dampened to prevent interference and errors in transmission. The present invention locates the single valued resistors on a network hub board. The present invention further provides resistors having resistance of approximately 22 ohms for use with a wide range of impedance transmission lines and signal baud rates.

13 Claims, 6 Drawing Sheets

Bottom Traces

Top Traces

DEVICES, METHODS, AND SYSTEMS FOR NETWORK HUB PARTIAL TERMINATION

FIELD OF THE INVENTION

The present invention relates generally to termination of reflected waves or otherwise propagated waves that are unwanted in a network, and in particular to use of partial termination by resistance located at the network hub for a star network.

BACKGROUND

The simplest network consists of only two sites or nodes. In the case of a two node network, each end of a single transmission line is terminated with a characteristic impedance, which results in no reflections of signals sent in either direction.

This ideal situation is compromised as soon as a third site is added to the network. In the situation of three or more nodes, the intermediate site must not load the transmission line or reflections of transmissions may occur. Thus, for n sites, each of the n sites must be prevented from loading the line, and use of proper termination is necessary to eliminate reflections and other unwanted wave propagation within the network.

Preventing loading and eliminating reflections can be accomplished by using a network configuration in which the transmission line starts at one node and loops through all intermediate sites, terminating at another end, such that the network constitutes essentially a chain of nodes. Such a network is often referred to as a "ring" network or a "token ring" network. The ring network, however, is not suitable for many applications, such as wiring in homes and houses and offices, which must connect to a central location.

In contrast to the ring network, which is ideal with regard to loading and reflections, typical networks include wire connections to all sites via a central point, referred to as a "hub". This type of network that has a common hub is referred to as a "star" network. The star configuration of nodes simplifies both the wiring of the network and the process of adding or removing a site, but at a great loss in high frequency performance. If the transmission lines are wired in parallel to the hub, from the point of view of any of the transmission lines, the hub appears as a discontinuity of $Z_0/(n_1)$ ohms (where $Z_0$ is a positive resistance value and n is the number of nodes), which for large networks can result in almost all the energy being reflected from the hub back to the sending station.

Commonly used integrated circuits for signaling, such as those falling under the broad classifications RS-422 and RS-485, for use with networks, are useful with twisted wire connections for a large number of sites. These integrated circuits typically require that no terminating resistance be placed at each site. As a result of this approach, the energy reflected from the hub back to the sending site is almost totally reflected, yet again, from the sending site back to the hub. For a large network having random lengths of connecting wire from the hub to each site, the ensuing cacophony of reflections increases the statistical possibility that the reflections will combine to create a brief reversal of signal polarity and hence a false transition at some site.

Further, in a typical network, transmission lines typically include two wires close together, such as two wires side-by-side, two wires arranged in a twisted pair, or concentric wires (e.g., a coaxial cable for a television). This wiring arrangement therefore constitutes conductors at a fixed distance apart for some considerable length of the conductor, producing a fixed capacitance and inductance per unit length, and thus a corresponding impedance. A characteristic of transmission lines so arranged is that, unlike single wires in a circuit, the wire pairs cannot carry an independent amount of voltage and current: in a single wire circuit, an applied voltage on the wire produces a given current running through the wire, and the voltage and the current typically are totally unrelated (i.e., do not affect each other); however, in a transmission line, the voltage and current are fixed relative to each other in a specific ratio.

Thus, all transmission lines have an impedance associated with them, which is the ratio of the voltage applied to the current that flows in the wire. For example, a transmission line having one volt applied may carry 20 milliamps. The impedance of the cable is the voltage divided by the current. In this example, 1 volt divided by 0.02 amps equals 50 ohms, which is the impedance of the cable.

Fifty ohm cables are commonly used with radios; televisions typically use 75 ohm cables; for twisted pairs such as those used for a 10 Base T network for a computer, the impedance is generally about 100 ohms, but typical impedance is not so precisely defined in this use as for radios and televisions. Category 5 wiring is generally used in businesses for computer networks. This type of wiring includes pairs of wires in which impedance is carefully controlled and repeatable so that each pair of wires has the same impedance.

With a simple network having two nodes connected by a transmission line, in order to minimize impedance and reflection, the transmission line may be terminated such that the resistance equals the impedance of the line. When a wave transmitted from one node reaches the far end of the wire (the receiving end), all of the energy of the wave is received and dissipated in that resistor and, importantly, none of it is reflected. If the resistor at the far end of the line does not match the characteristic impedance of the line, a reflection is produced. The reflection is positive if the resistor value exceeds the impedance of the line and negative if the impedance of the line exceeds the resistance of the resistor.

Thus, matching the resistor to the impedance is simple for a network consisting of two nodes. For example, for a 50 ohm impedance transmission line coaxial cable, a 50 ohm resistor is used at each end of the network; or the transmission line is a twisted pair, 100 ohms is used at each end. Whichever type of transmission line is used, signals travel in both direction between the nodes, reach the respective resistors and are fully dampened.

The appropriate amount of resistance to apply when more than two nodes is involved, however, is much more complicated that the situation with two nodes.

In the "star" network, the central point is referred to as the "hub" of the network or the "network hub." A problem with the star network is that, once a third site is added, determining the appropriate resistance to place at each node in order to prevent reflection becomes complicated. For example, with a star network having three nodes "a," "b," and "c," and a central hub, the three sites radiate out from a center point, along three lines. If a signal is sent from "a" to "b" and "c", the signal first proceeds down a spoke to the central hub. At the point of reaching the central hub, the signal must proceed out two spokes to nodes "b" and "c." Thus, there is now not a single transmission line of 100 ohms, but two transmission lines. As a result, at the central point, the wave encounters half the impedance of the first spoke: in the example above, the spokes to "b" and "c" in parallel produce an impedance for the wave coming down leg "a," of 50 ohms, rather than 100 ohms. The twisted pairs of wires are around 100 ohms impedance each, but two of them wired together in parallel have an impedance of 50 ohms each ($R=1/(1/R_1+1/R2)=R_1R_2/(R_1+R_2)=R_1/2$, since $R_1=R_2$ 100 ohms). Similarly, for four spokes, three spokes to which a wave is transmitted produces each have 33 ohms of impedance; with five spokes, each has 25 ohms impedance. This situation becomes even more complicated to the extent that any differences in impedance exist with respect to the different lines.

As a result of the arrangement of the star network, equivalent impedance of the transmission lines tends toward zero as the number of nodes on the network becomes very large. A problem thus exists in the prior art with overcoming the situation in which a signal is sent from "a" to all the other sites, while preventing, once the signal reaches the central hub, due to the severe impedance mismatch, a large portion of the energy being reflected back to "a." Further, after the wave is reflected from the central hub back to "a", if "a" does not absorb all of the energy of the reflected wave, a second reflection from "a" occurs. The wave from this second reflection proceeds back to the hub, where yet another reflection occurs, and so on.

A graphical representation of the voltage on the transmission line produced by such reflections, viewed, for example, on an oscilloscope as a function of time, presents a series of oscillations as the wave is traveling down the transmission line—everything is stable until the wave reaches either the hub or node, and then a reflection occurs, with a corresponding new voltage, until that reflection hits the node or hub, again, and so forth, in an oscillating manner. A typical wave so produced is shown in FIG. 1, which presents the voltage at one end of a line as a function of time for a network having 10 100 foot lines.

There exists, therefore, a need for a system, method, and device for constructing a network, which allows simple connection of wires, to solve the problem of reflections in a network. There is a need to solve the problem in such a manner that no particularly special or expensive equipment or expertise is needed to match the impedances and absorb the reflective waves. Thus, there is a need for the problem to be solvable by a single device that is applicable to networks having widely varying arrangement and number of nodes.

SUMMARY OF THE INVENTION

The preferred embodiments of the present invention provide systems and devices for a network hub that include a single valued resistor placed in series with each transmission line such that reflected and other unwanted waves in the transmission line are rapidly dampened to prevent interference and errors in transmission.

The preferred embodiments of the present invention also provide methods and systems for determining an appropriate single valued resistor serially placeable within a transmission line in a network such that reflected and other unwanted waves in the transmission line are rapidly dampened to prevent interference and errors in transmission.

The preferred embodiments of the present invention also locate the single valued resistors on a network hub board.

The preferred embodiments of the present invention also provide resistors having resistance of approximately 22 ohms for use with a wide range of impedance transmission lines and signal baud rates.

The present invention solves the problems of the prior art by utilizing a single value resistor in each spoke of the network, in which the resistance is matched appropriately to dampen reflections and other unwanted wave propagations without otherwise significantly impacting the transmitted signal for the network cable used. Instead of trying to match the impedance of each spoke exactly, an embodiment of the present invention involves partially terminating each signal as the signal reaches the hub.

In an embodiment of the present invention, resistors are added in series with each transmission line, so as to partially terminate each reflected signal within the transmission line. An embodiment of the present invention thus uses partial termination to solve the problems of undesired reflective and other waveforms produced in a network line. The partial termination of an embodiment of the present invention uses two series resistors, which are a significant fraction of $Z_o$, the impedance of the transmission line, in series with each line entering the hub. When a site transmits a signal to the hub and then to the other n−1 sites on the network, the signal must pass through a partial termination as it enters the hub. Since the impedance of the n−1 lines approach zero, the load presented to the incident signal is $2R_s$ where $R_s$ is the series resistor in each side of the line at the point the line enters the hub.

Increased $R_s$ decreases the reflection coefficient but increases the time to charge the capacitance of all n−1 lines. In an embodiment of the present invention, the reflection coefficient of each signal entering the hub is adjusted by varying $R_s$ until a universally applicable $R_s$ is identified for a range of capacitances.

One preferred embodiment of the present invention includes a network hub, comprising a plurality of transmission line connections for connecting a plurality of network nodes to each other, wherein each of the plurality of network nodes is connected to a transmission line, and wherein the transmission line is connectable to at least one of the plurality of transmission line connections; and a plurality of circuit paths for connecting the plurality of transmission line connections, wherein each of the plurality of transmission line connections is connected by a subset of the plurality of circuit paths to every other transmission line connection; wherein each of the plurality of circuit paths includes at least a first resistor coupled to at least a first transmission line connection and at least a second resistor coupled to at least a second transmission line connection and the first resistor is coupled to the second resistor.

Another preferred embodiment of the present invention includes a method for determining a series resistance for partial termination of reflected signals in a network having a network hub and a plurality of nodes, wherein the network hub has a plurality of connections for connecting to the plurality of nodes by a plurality of transmission lines, and wherein a plurality of circuit paths connect each node to every other node, comprising connecting a single value resistor to each of the plurality of connections within each of the plurality of circuit paths, such that each of the plurality of circuit paths includes at least a first resistor coupled to at least a first transmission line connection and at least a second resistor coupled to at least a second transmission line connection and the first resistor is coupled to the second resistor; applying a signal to one of the plurality of connecting lines, the one of the plurality of connecting lines having a transmission voltage; measuring the transmission voltage of the one of the plurality of connecting lines over a predetermined time period; varying the value of the single value resistor and repeating the applying and measuring until the signal is suitably dampened.

Another preferred embodiment of the present invention includes a network for transmitting a signal, the network having a signal dampener, comprising a network hub having a plurality of connection points connected by a plurality of circuit paths, wherein each of the circuit paths connects a connection point to every other connection point; a plurality of nodes connected to the network hub at a plurality of connection points by a plurality of transmission lines; wherein each of the plurality of circuit paths includes a single value dampening resistor coupled to every connection point, and wherein the single value dampening resistor is selected so as suitably dampen the signal.

Additional aspects and novel features of the invention will be set forth in part in the description that follows, and in part will become more apparent to those skilled in the art upon examination of the present disclosure.

DETAILED DESCRIPTION

The present invention solves the problems of the prior art by utilizing a single value resistor in each spoke of the network, in which the resistance is matched appropriately to dampen reflections and other unwanted wave propagations without otherwise significantly impacting the transmitted signal for the network cable used. Instead of trying to match the impedance of each spoke exactly, an embodiment of the present invention involves partially terminating each signal as the signal reaches the hub.

In an embodiment of the present invention, resistors are added in series with each transmission line, so as to partially terminate each reflected signal within the transmission line. An embodiment of the present invention thus uses partial termination to solve the problems of undesired reflective and other waveforms produced in a network line. The partial termination of an embodiment of the present invention uses two series resistors, which are a significant fraction of $Z_o$, the impedance of the transmission line, in series with each line entering the hub. When a site transmits a signal to the hub and then to the other n−1 sites on the network, the signal must pass through a partial termination as it enters the hub. Since the impedance of the n−1 lines approach zero, the load presented to the incident signal is $2R_s$ where $R_s$ is the series resistor in each side of the line at the point the line enters the hub.

Increased $R_s$ decreases the reflection coefficient but increases the time to charge the capacitance of all n−1 lines. In an embodiment of the present invention, the reflection coefficient of each signal entering the hub is adjusted by varying $R_s$ until a universally applicable $R_s$ is identified for a range of capacitances.

In an embodiment of the present invention, which is applicable to, for example, an approximately 100 ohm twisted-pair line, a pair of resistors of approximately 22 ohms is placed in series with each wire of the transmission line. In an embodiment of the present invention, the approximately 22 ohm resistors are usable with a wide range of impedances of transmission lines over a wide low range of transmission rates, and particularly baud rates of 9600 and 19,200, and other relatively low transmission rates.

Figure 2:
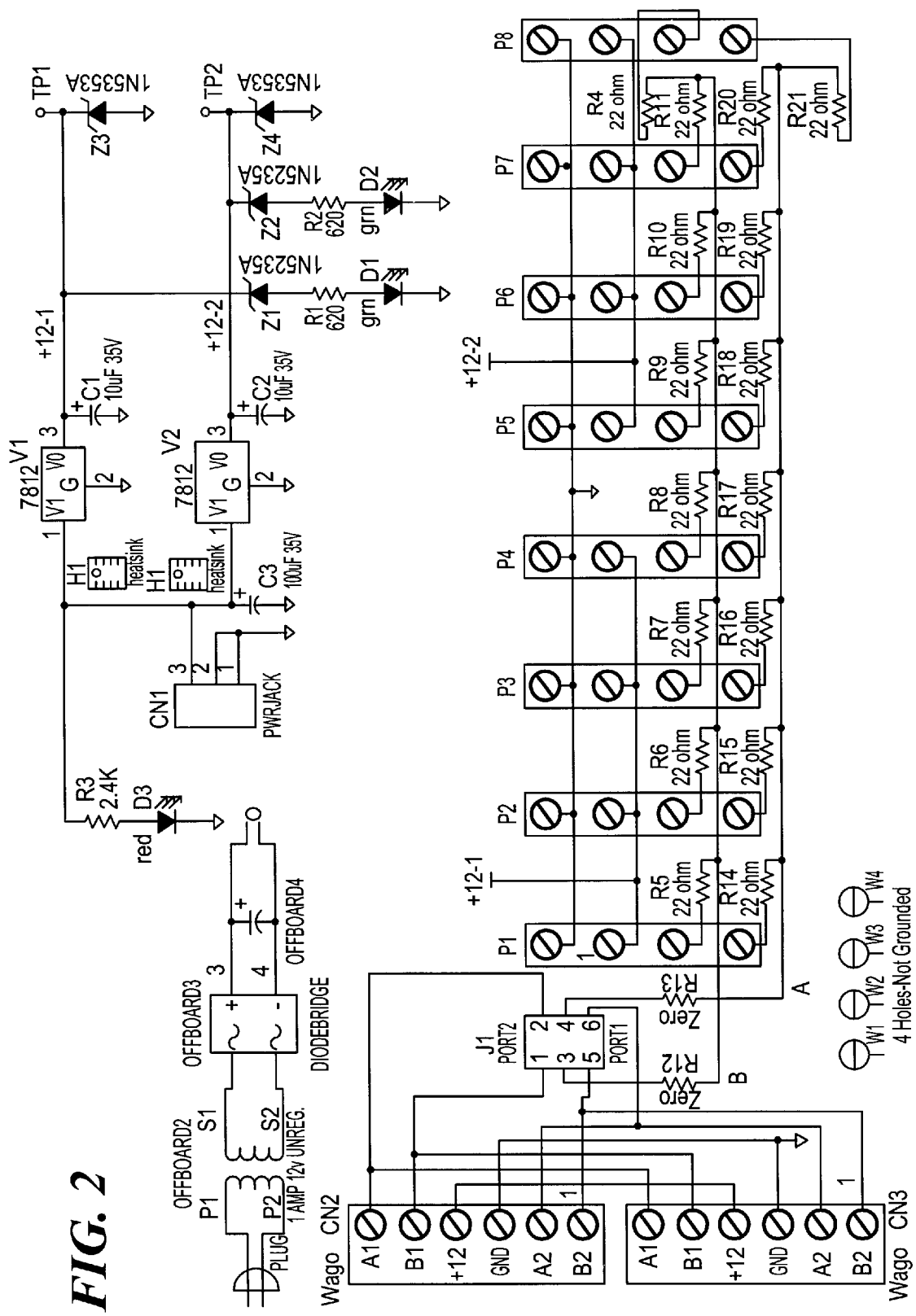
FIG. 2 presents a network hub board wiring diagram for an embodiment of the present invention incorporating 22 ohm resistors.

As a result of use of these resistors in series, as the number of nodes and spokes n approaches a very large number (i.e., the number is much greater than 2, 3, or 4), the impedance as the wave approaches the hub does not approach zero, but instead approaches 44 ohms, the resistance of the two resistors in series. An embodiment of the present invention using 22 ohm resistors on a network hub board is shown in FIG. 2.

Figure 1:
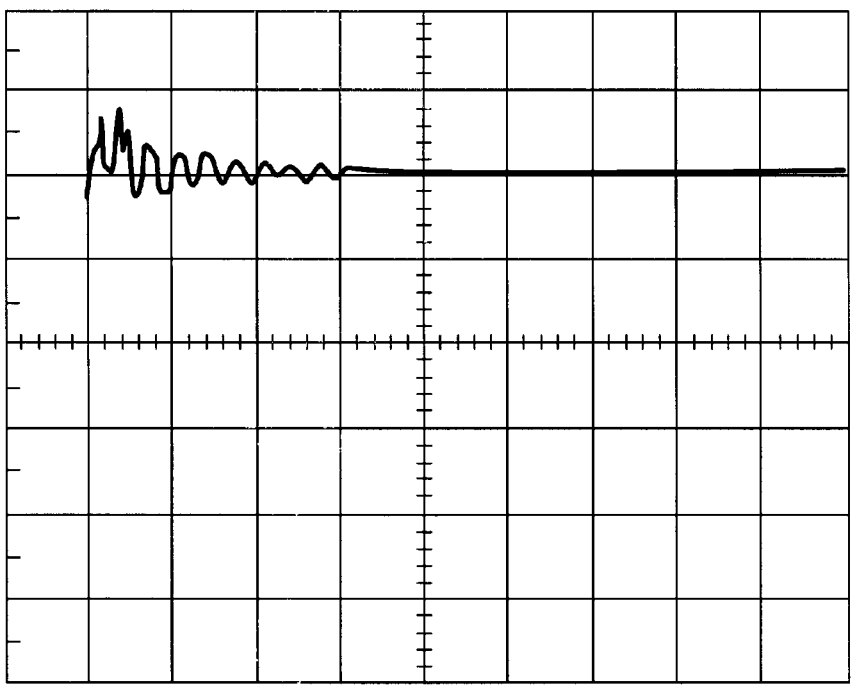
FIG. 1 depicts a typical wave form produced in one transmission line of an example network having ten 100 foot lines in parallel.
Figure 3:
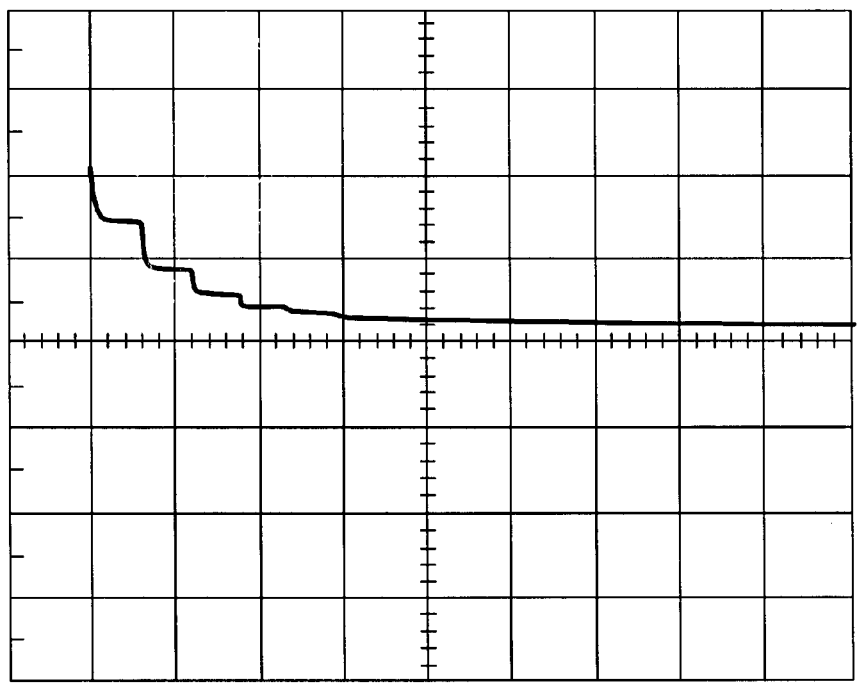
FIG. 3 shows a typical stepped output in one transmission line of an example network having ten 100 foot transmission lines in parallel with partial termination according to an embodiment of the present invention.

A benefit of use of the pair of 22 ohm resistors in series with each line is that a large portion of the energy is absorbed by the resistors, and, as a result, only a small amount of energy in the reflected signal returns to the sending point (e.g., node "a"). This reflected signal typically has only a small fraction of the energy of the original signal, typically less than one half the energy of the transmitted wave. In addition, because of additional source termination—the impedance of the source, which, for example, may be approximately 100 ohms, the reflected energy of the wave is reduced further, and in a short number of reflections, the magnitude of the waves for each reflection is attenuated in short order. A graphical representation from an input to an oscilloscope of transmission line voltage for a single transmission line of a network incorporating a network hub according to an embodiment of the present invention is shown in FIG. 3. The network for the readout of the example shown in FIG. 3 includes ten 100 foot transmission lines connected to nodes, with 22 ohm resistors in each transmission line circuit at the network hub.

An embodiment of the present invention provides additional advantages over the prior art. A problem with the prior art is that it contains no simple method, system, or device for addressing signal distribution over differing cable lengths, cable impedances, and numbers of cables. For an arbitrary number of hubs (e.g., 13), with arbitrary connecting wire lengths (e.g., 50 feet on one hub; 300 feet on another hub), through which a signal is transmitted from a random node in the network containing these hubs, at a random second node, the resulting signal produces a phenomenon that is further describable as follows. An example low to high transition signal is transmitted in the transmission line, in which the transmission begins at zero volts and increases to five volts. Ideally, the transmission is monotonic as the magnitude of the transmission increases.

However, in an interference situation, a monotonic transmission may not occur. Instead, a graphical representation of the transmission produces the following. The wave begins to increase in value, but due to reflections combining nonadvantageously (i.e., negatively interfering with the wave), the reflections combine so that, as observed at another node, the magnitude of the wave increases, and then, due to a reflection, the wave decreases, and then begins to again increase, so that a "hook" appears in the graphically plotted curve of the wave. A horizontal line is drawable through this "hook" structure in this graph, and the line passes through the same vertical point (the magnitude of the wave) three times. (The line passes through the curve as the curve begins increasing, again as the curve decreases, and a third time as the curve increases again as, in the example, the curve increases to the final five volt value.) With this phenomenon, there is always a value—a certain point on the graph—through which the wave, from beginning to end has passed three times.

This hook phenomenon is referred to as a "glitch" in the transmission. This "glitch" can produce errors, anomalies, and other problems in equipment. In an embodiment of the present invention, partial termination provides a preferred resistance value at the hub for all network situations for any number of sites and any length of connecting wires. This partial termination avoids the possibility of disadvantageous reflections occurring and, by occurring, thereby forming non-monotonic transitions from low to high, or high to low, as described in the example above.

Figure 4:
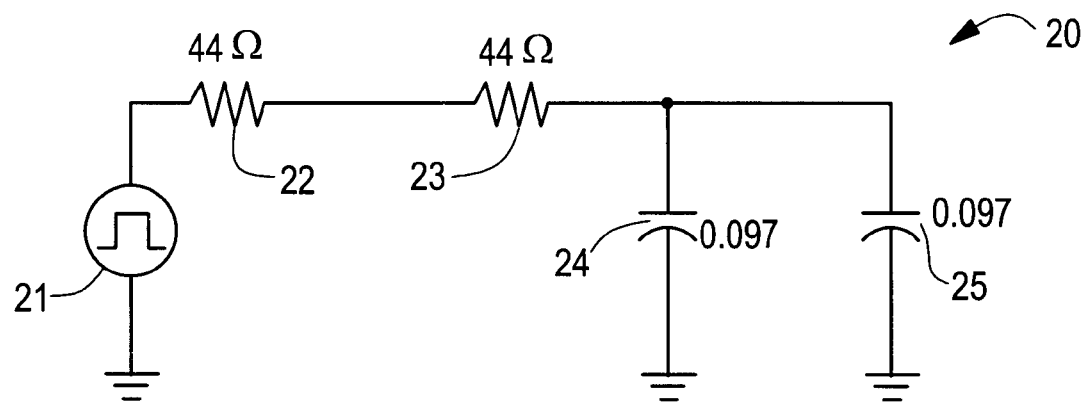
FIG. 4 is a first order equivalent circuit that provides an accurate model of the transmission line with partial termination for low frequency phenomenon according to an embodiment of the present invention.

An embodiment of the present invention utilizes a determined resistance value that is broadly applicable to a wide range of impedances, a large number of nodes, and a wide range of transmission rates, especially transmission rates of 9600 and 19,200 baud, as well as other relatively low transmission rates. In an embodiment of the present invention, a first order equivalent circuit transmission line, as shown in FIG. 4, is used to determine the appropriate resistance value. The first order equivalent circuit shown in FIG. 4 provides an accurate model of the transmission line for low frequency phenomenon. Low frequency applicability in this model means that the model applies when the time required for a signal to travel from one end of the transmission line to the other end of all other transmission lines is small with respect to the time of interest.

The time required for a signal to so travel in approximately 100 foot transmission lines is calculable as follows. For a signal traveling unimpeded at a velocity (v) of the speed of light ($\approx 1\times 10^9$ ft/sec), with a velocity factor of 0.9, which is typical for a parallel transmission line, the time (t) of travel over the length (d) is:

t=d/v=200 feet/($1\times 10^9$ ft/sec$\times 0.9$)$\approx$0.22 $\mu$sec.

In FIG. 4, the circuit 20 includes a pulse generator 21, two 44 ohm resistors 22, 23, and two 0.097 $\mu$F capacitors 24, 25. The circuit models the dampening resistors in a network hub and the capacitance of the cables connected to the hub. For a 9600 or 19,200 baud rate pulse generation, a typical low data rate for a serial port to which an embodiment of the present invention is applicable, the period of the signal corresponding to the baud rate is about 104 $\mu$sec. The time constant associated with the RC circuit formed by the resistors and capacitors in the circuit of FIG. 4 is approximately as follows:

T=R$\times$C=44 $\Omega\times$0.094 $\mu$F$\approx$4 $\mu$sec

Since both the 0.22 $\mu$sec travel time and the 4 $\mu$sec time constant of the RC circuit are much less than 104 $\mu$sec, the model indicates that the distortion due to the partial termination produced by the model circuit is unlikely to interfere with transmissions at this baud rate.

In an embodiment of the present invention, the resistance value is further modeled for use with a typical 100 foot transmission line. A typical 100 foot transmission line for use with an embodiment of the present invention has a capacitance (C) of approximately 10.47 pF/foot and inductance (L) of approximately 0.198 $\mu$H/foot. The impedance (Z) associated with such a transmission line is calculable as follows:

Z=(L/C)$^{1/2}$=(0.198 $\mu$H/10.47 pF)$^{1/2}\approx$138 $\Omega$

Using the 100 foot transmission line with the model circuit shown in FIG. 4, the measured stepped reduction (see, e.g., FIG. 3) of a signal generated was about 90% after five reflections.

Using an example application of this embodiment of the present invention to a network having 32 nodes and 32 transmission lines further illustrates the function of the present invention. For a 32 transmission line network, a signal transmitted from one node to the other 31 nodes results in an equivalent resistance ($R_E$) of the 31 other transmission lines at the network hub of about the following:

$R_E = 1/(1/R_1 + 1/R_2 ... + 1/R_{31}) =$ $R/31$(since all $R$ are equal to 138 $\Omega$) = 138 $\Omega/31 \approx 4\Omega$ In an embodiment of the present invention, two 22 ohm resistors are in series with the equivalent resistance of 4 ohms, and thus the total equivalent resistance of the series is about 48 ohms. For a signal on a 138 ohm transmission line, the reflection coefficient ($C_R$) at the hub, where Z is the terminal impedance and $Z_o$ is the transmission line impedance, is thus:

CR=(Z-$Z_o$)/(Z+$Z_o$)$\approx$(48 $\Omega$-138 $\Omega$)/(48 $\Omega$+138 $\Omega$)=-0.48

As a result, the signal transmitted is reduced to about 52% of its initial magnitude upon each reflection. Thus, after two reflections, about 27% of the energy of the transmitted signal is reflected, and after three reflections, 14% remains. Thus, it can be seen that the signal is very rapidly reduced.

In an embodiment of the present invention, use of 44 ohms of series resistance is preferred over greater or lesser resistance for typical low baud rate applications. Use of resistances much less than 44 ohms has a greatly reduced effect on dampening, while use of resistances greater than 44 ohms limits maximum length of the transmission line to any given node, causing distortion of the front of the waveform for the transmitted signal.

An embodiment of the present invention addresses the problem of how to relax the requirements for addressing distortion while achieving satisfactory termination. This problem is not automatically solved by transmitting information at a lower baud rate. In an embodiment of the present invention, this problem is addressed regardless of the baud rate of transmission, so long as the baud rate is relatively low. For example, for a two-wire line, only two signals, high and low, are typically transmitted. For a typical low baud rate such as 9600 or 19,200, which is a very low baud rate for network transmission lines and as much as three or four orders of magnitude (e.g., 1,000 or 10,000 times) less than these lines are theoretically capable of handling, termination is not typically a concern. However, with random lengths of wires and random numbers of nodes, the reflected waves could combine to temporarily produce some glitches. These glitches on occasion present a problem for the communication equipment sending messages over the lines; the messages become garbled, and errors are introduced.

The present invention solves this problem by introducing a partial termination that prevents non-monotonic transition and allows installation of the system without consideration of the skill level of the installing technicians. Thus, the technicians are not required to provide thought as to the theoretical performance of the network, but are able simply to connect random lengths of wire in, for example, a house. Further, in an embodiment of the present invention, different segments of wire, as well as differing types of wire, may be used within the same transmission line. An embodiment of the present invention thus allows a non-technical person to follow simple rules, such as instructions to connect one color wire to one terminal and another color wire to another terminal, without regard to the length of the wire.

Figure 5:
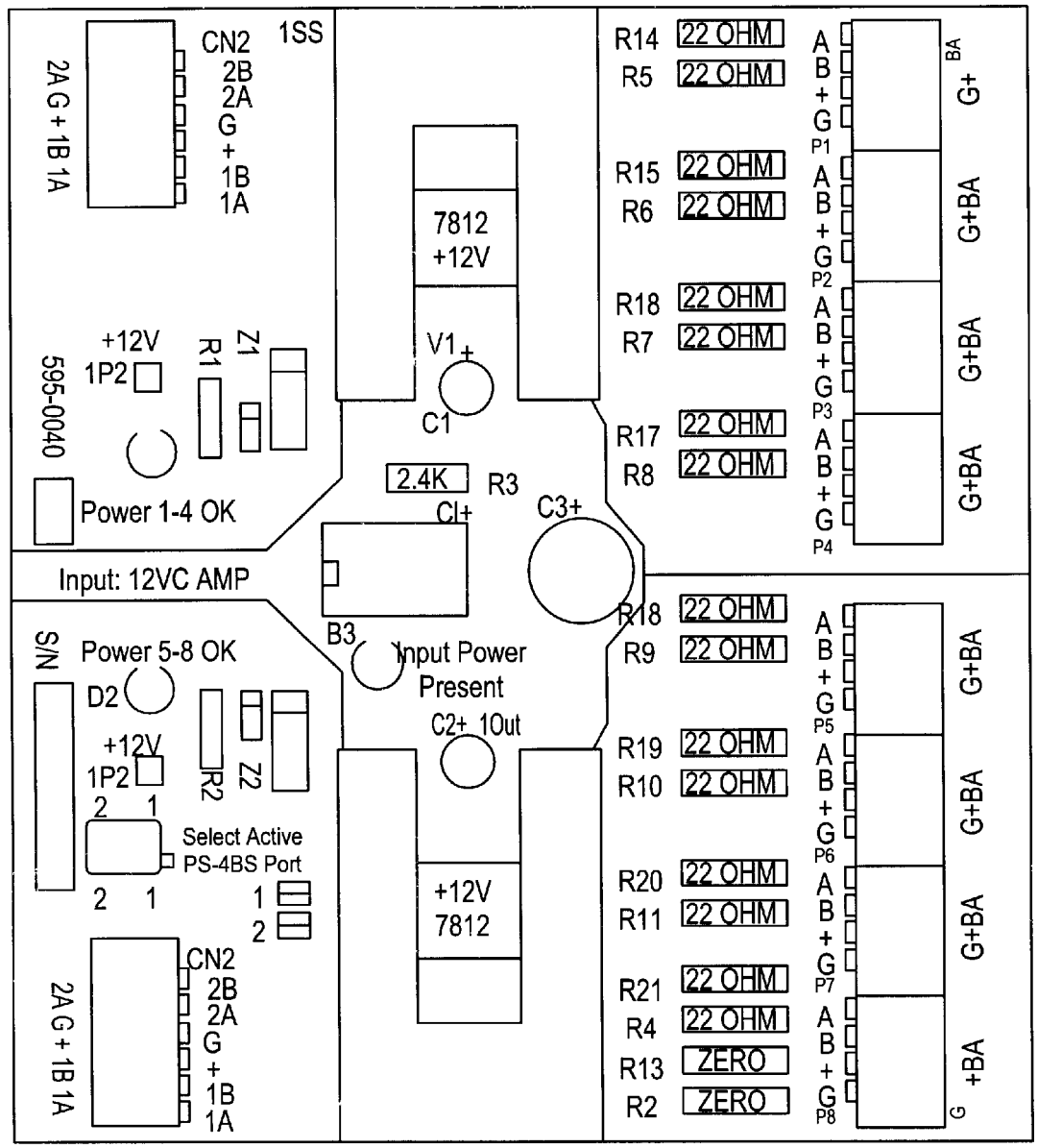
FIG. 5 presents an overhead view of a network hub board according to an embodiment of the present invention.
Figure 6:
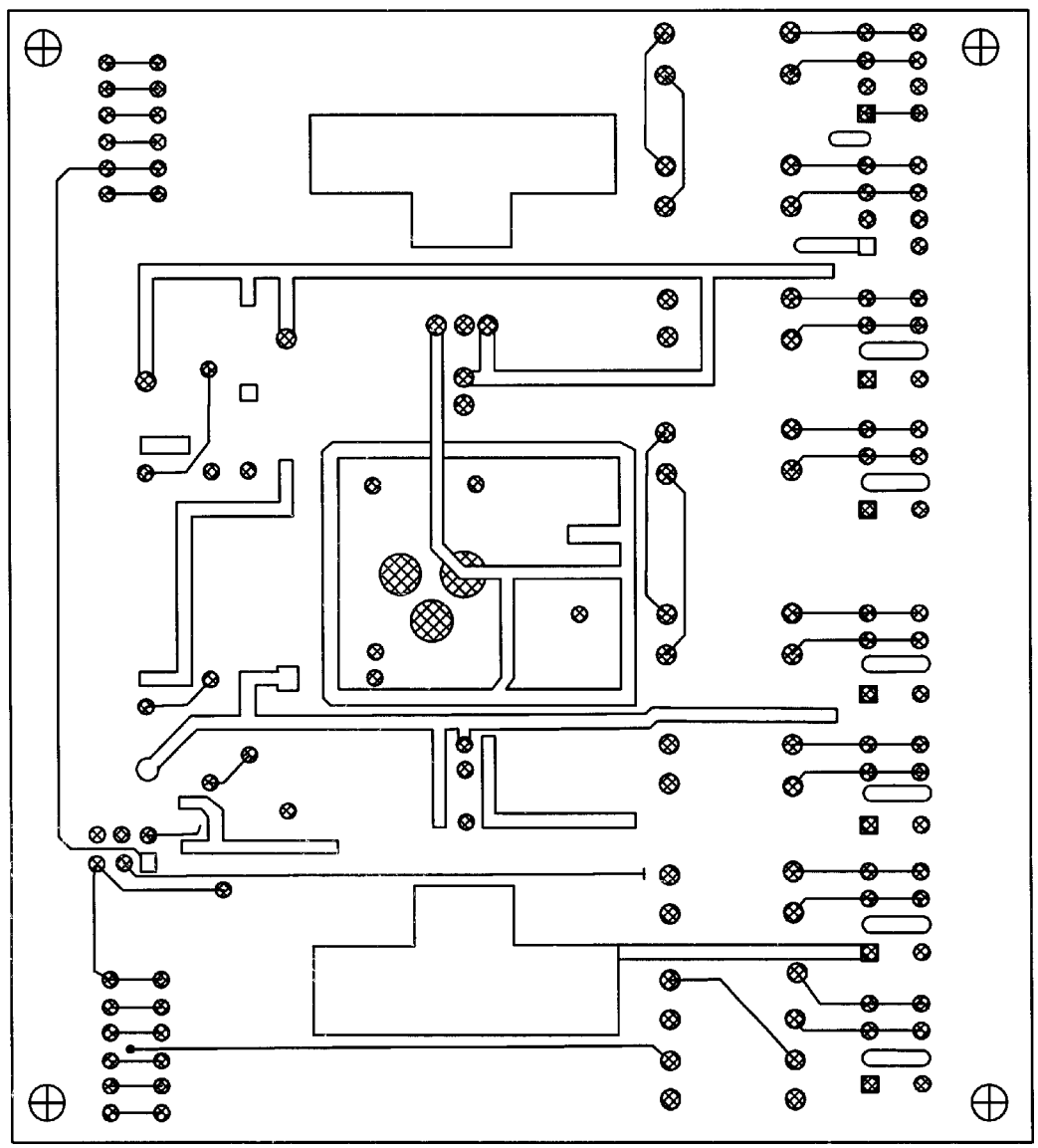
FIG. 6 shows an overhead view of the bottom traces for the network hub board of FIG. 5 for an embodiment of the present invention.
Figure 7:
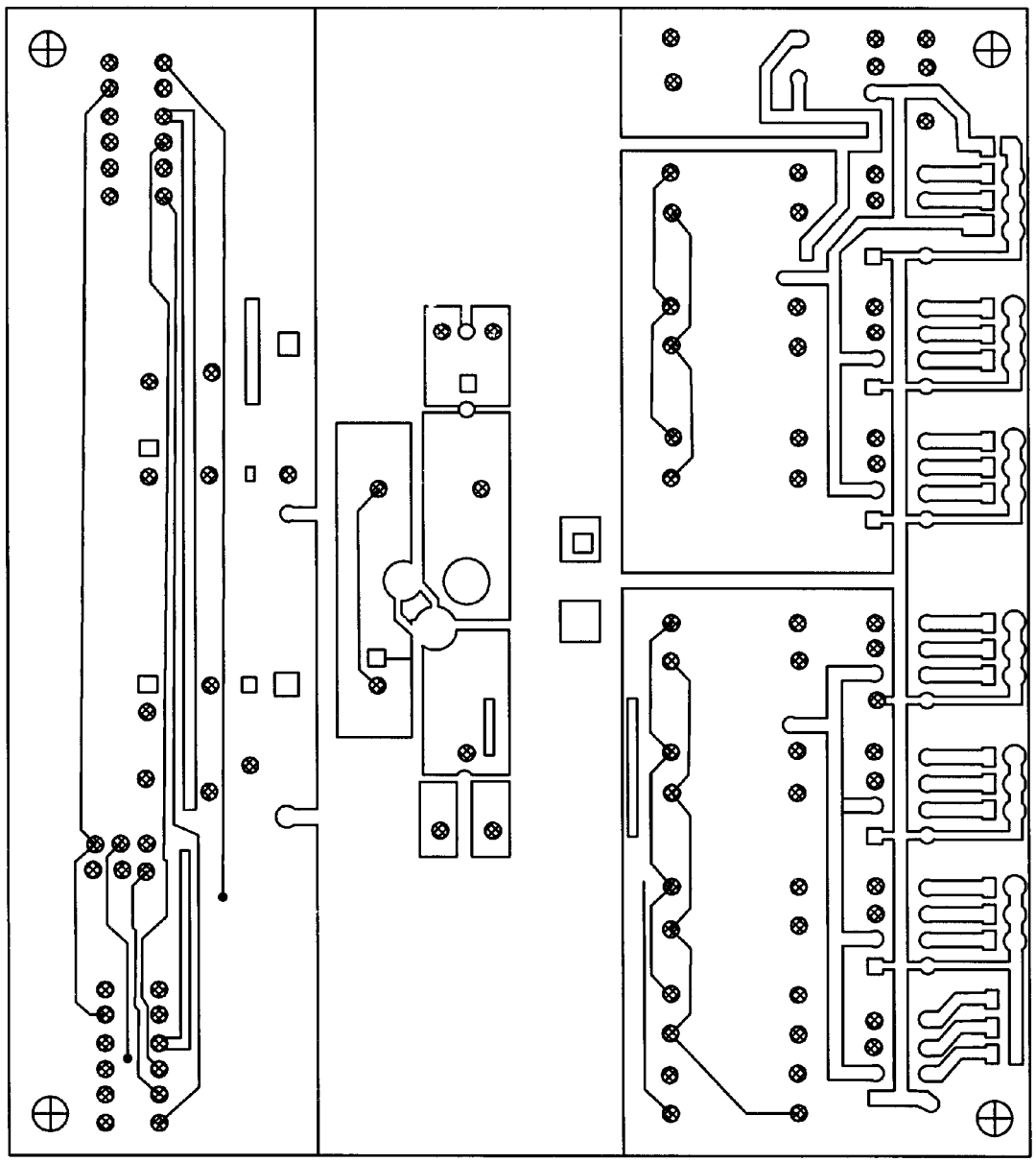
FIG. 7 is an overhead view of the top traces for the network hub board of FIG. 5 for an embodiment of the present invention.

FIG. 5 presents an overhead view of a network hub board according to an embodiment of the present invention. FIG. 6 shows an overhead view of the bottom traces for the network hub board of FIG. 5 for an embodiment of the present invention. FIG. 7 is an overhead view of the top traces for the network hub board of FIG. 5 for an embodiment of the present invention.

Figure 8:
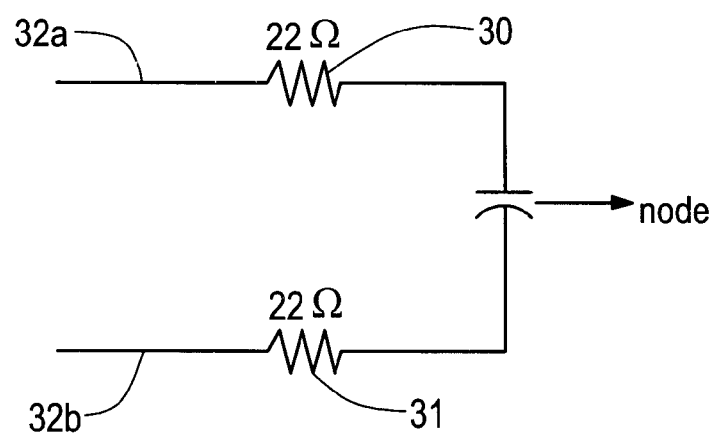
FIG. 8 presents another embodiment of the present invention incorporating 22 ohm resistors and a capacitor between the pair of wires for a transmission line.

In another embodiment of the present invention, the dampening circuit path of the transmission lines at the network hub further includes a capacitor of a determined value situated between the pair of wires comprising the transmission line, as shown in FIG. 8. The circuit path shown in FIG. 8 includes two 22 ohm resistors 30, 31 in series with the pair of wires 32a, 32b comprising the transmission line. In addition, between the pair of wires 32a, 32b in series with the two resistors 30, 31 is situated a capacitor of a determined value. The determined value of the capacitor is as follows. For a typical number of nodes and transmission lines, such as 32, used in conjunction with a network hub for an embodiment of the present invention, the drivers typically produce 30 mA of current. The appropriate capacitance (C) corresponding to this current (I) for the time constant (T) associated with the 22 $\Omega$RC circuit and a typical signal of 4 V is as follows:

$$T=R\times C=22\ \Omega\times 0.105\ \mu F\approx 2\ \mu sec$$

$$C=IT/V=(30\ mA\times 2\ \mu sec)/4\ V=15\ \mu F.$$

An advantage of using the capacitor in this embodiment is that for very high frequency signals, the capacitor acts like a short, such that the terminating resistance of the two resistors approaches the sum of the resistors, 44 ohms, producing more rapid dampening at these high frequencies and reducing electromagnetic interference. A drawback of use of this capacitor is that the signal produced can be distorted at the front end of the signal waveform.

Embodiments of the present invention have now been described in fulfillment of the above objects. It will be appreciated that these examples are merely illustrative of the invention. Many variations and modifications will be apparent to those skilled in the art.

What is claimed is:

1. A network hub system, comprising:
a plurality of transmission line connections for connecting a plurality of network nodes to each other, wherein each of the plurality of network nodes is connected to a transmission line capable of transmitting a signal, and wherein the transmission line is connectable to at least one of the plurality of transmission line connections; and
a plurality of circuit paths connected directly to a network hub for partially terminating a transmitted signal and for directly connecting the plurality of transmission line connections, wherein each of the plurality of transmission line connections is connected by a subset of the plurality of circuit paths to every other transmission line connection;
wherein each of the plurality of circuit paths includes at least a first resistor coupled to at least a first transmission line connection and at least a second resistor coupled to at least a second transmission line connection; and
wherein each of the transmission line connections is simultaneously connectable to two or more other transmission line connections through at least one of the plurality of circuit paths and further wherein the transmission lines connected to each of the plurality of network nodes are not of equal length.

2. The network hub of claim 1 wherein the first resistor has a first resistance value and the second resistor has a second resistance value, and wherein the first resistance value and the second resistance value are approximately equal.

3. The network hub of claim 2 wherein the first resistance value and the second resistance value are each about 22 ohms.

4. The network hub of claim 1 wherein the transmission line for at least one of the plurality of network nodes has an impedance of about 100 ohms.

5. The method of claim 1, wherein the first resistor is coupled to a second resistor by a physical capacitor, with one end of the capacitor connected to the first resistor and the other end of the capacitor connected to a second resistor.

6. A method for determining a series resistance for partial termination of reflected signals in a network having a network hub and a plurality of nodes, wherein the network hub has a plurality of connections for connecting to the plurality of nodes by a plurality of transmission lines of non-uniform lengths, and wherein a plurality of circuit paths directly connected to the network hub connect each node to every other node, comprising:
connecting a single value resistor to each of the plurality of connections within each of the plurality of circuit paths, such that each of the plurality of circuit paths includes at least a first resistor coupled to at least a first transmission line connection and at least a second resistor coupled to at least a second transmission line connection and the first resistor is coupled to the second resistor;
applying a signal to one of the plurality of connecting lines, the one of the plurality of connecting lines having a transmission voltage;
measuring the transmission voltage of the one of the plurality of connecting lines over a predetermined time period;
varying the value of the single value resistor and repeating the applying and measuring until the signal is suitably dampened;
setting a same value for the first resistor and the second resistor; and short circuiting one end of the first resistor with one end of the second resistor, wherein the first and second resistor act to partially terminate a signal passing through one of said plurality of transmission lines.

7. The method of claim 6 wherein each of the plurality of transmission lines has a length and a characteristic impedance, such that the impedance and length of each of the plurality of transmission lines produce an oscillating effect on the applied signal, and wherein the signal is suitably dampened by the single value resistor.

8. The method of claim 6 wherein the signal has a signal time period, wherein each of the plurality of transmission lines has a length and a characteristic impedance, such that the impedance and length of each of the plurality of transmission lines produce an oscillating effect on the applied signal, the oscillating effect having an oscillating time period, and wherein the signal is suitably dampened by the single value resistor when the oscillating time period is much less than the signal time period.

9. The method of claim 8 wherein the oscillating time period is not more than approximately one order of magnitude less than the signal time period.

10. A network for transmitting a signal, the network having a signal dampener, comprising:
  a network hub directly connected to a plurality of circuit paths having a plurality of connection points connected by the plurality of circuit paths, wherein each of the circuit paths is capable of simultaneously connecting a connection point to every other connection point;
  a plurality of nodes connected to the network hub at a plurality of connection points by a plurality of transmission lines of non-uniform lengths;
  wherein each of the plurality of circuit paths includes a single value dampening resistor coupled to every connection point, and wherein the single value dampening resistor is selected so as to suitably dampen the signal; and
  wherein the resistance value of the single value dampening resistor of each of the plurality of circuit paths is the same, and at least one single value dampening resistor is short circuited with another single value dampening resistor.

11. The method of claim 10 wherein each of the plurality of transmission lines has a length and a characteristic impedance, such that the impedance and length of each of the plurality of transmission lines produce an oscillating effect on the signal, and wherein the signal is suitably dampened by the single value dampening resistor.

12. The method of claim 10 wherein the signal has a signal time period, wherein each of the plurality of transmission lines has a length and a characteristic impedance, such that the characteristic impedance and length of each of the plurality of transmission lines produce an oscillating effect on the signal, the oscillating effect having an oscillating time period, and wherein the signal is suitably dampened by the single value dampening resistor when the oscillating time period is much less than the signal time period.

13. The method of claim 12 wherein the oscillating time period is not more than approximately one order of magnitude less than the signal time period.

* * * * *

UNITED STATES PATENT AND TRADEMARK OFFICE
CERTIFICATE OF CORRECTION

PATENT NO. : 6,404,299 B1
DATED : June 11, 2002
INVENTOR(S) : William H. Avery, Jr.

It is certified that error appears in the above-identified patent and that said Letters Patent is hereby corrected as shown below:

<u>Column 3,</u>
Line 5, "R2" should read -- $R_2$ --; and

<u>Column 8,</u>
Line 35, "CR=" should read -- $C_R=$ --.

Signed and Sealed this

Eighth Day of April, 2003

JAMES E. ROGAN
*Director of the United States Patent and Trademark Office*